US012614503B2

(12) United States Patent
Kim et al.

(10) Patent No.: US 12,614,503 B2
(45) Date of Patent: Apr. 28, 2026

(54) DISPLAY DEVICE USING IMAGE DATA FROM A SCALER AND METHOD FOR CONTROLLING SAME

(71) Applicant: SAMSUNG ELECTRONICS CO., LTD., Suwon-si (KR)

(72) Inventors: Hyunho Kim, Suwon-si (KR); Taekgyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/025,291

(22) Filed: Jan. 16, 2025

(65) Prior Publication Data

US 2025/0157386 A1 May 15, 2025

Related U.S. Application Data

(63) Continuation of application No. PCT/KR2023/011625, filed on Aug. 8, 2023.

(30) Foreign Application Priority Data

Oct. 4, 2022 (KR) ........................ 10-2022-0126627

(51) Int. Cl.
*G09G 3/20* (2006.01)

(52) U.S. Cl.
CPC ..... *G09G 3/2096* (2013.01); *G09G 2300/026* (2013.01); *G09G 2330/026* (2013.01)

(58) Field of Classification Search
CPC .................................................... G09G 3/2096
See application file for complete search history.

(56) References Cited

U.S. PATENT DOCUMENTS

| | | | |
|---|---|---|---|
| 8,510,541 B2 | 8/2013 | Katayama et al. |
| 8,552,968 B2 | 10/2013 | Chung et al. |
| 9,374,575 B2 | 6/2016 | Yeo et al. |
| 10,825,378 B2 | 11/2020 | Kim et al. |
| 11,200,850 B2 | 12/2021 | Choi |

(Continued)

FOREIGN PATENT DOCUMENTS

| | | |
|---|---|---|
| KR | 10-1999-0066406 A | 8/1999 |
| KR | 10-2003-0059551 A | 7/2003 |

(Continued)

OTHER PUBLICATIONS

KR 100624134 B1 machine translation (Year: 2025).*

(Continued)

*Primary Examiner* — Gustavo Polo
(74) *Attorney, Agent, or Firm* — Sughrue Mion, PLLC

(57) ABSTRACT

Disclosed is a display device including a display module, a scaler that outputs image data in a pre-defined format by processing an image signal input through an input source, and a timing controller that controls an operation of the display module based on the image data output from the scaler. The pre-defined format includes an image frame period in which the image data is included and a blank period in which the image data is not included. The scaler outputs a panel on signal for turning-on the display module by using the blank period, and the timing controller turns on the display module based on the panel on signal included in the blank period being identified.

15 Claims, 8 Drawing Sheets

(56) References Cited

U.S. PATENT DOCUMENTS

| | | | |
|---|---|---|---|
| 2003/0122772 A1 | 7/2003 | Park et al. |
| 2018/0033360 A1 | 2/2018 | Bae et al. |
| 2019/0107883 A1 | 4/2019 | Ma |

FOREIGN PATENT DOCUMENTS

| | | | |
|---|---|---|---|
| KR | 10-0535214 | B1 | 12/2005 |
| KR | 10-0624134 | B1 | 9/2006 |
| KR | 10-2007-0002220 | A | 1/2007 |
| KR | 10-0883778 | B1 | 2/2009 |
| KR | 10-2010-0024873 | A | 3/2010 |
| KR | 10-2016-0036753 | A | 4/2016 |
| KR | 10-1817939 | B1 | 1/2018 |
| KR | 10-2101196 | B1 | 4/2020 |
| KR | 10-2020-0089951 | A | 7/2020 |
| KR | 10-2021-0086294 | A | 7/2021 |

OTHER PUBLICATIONS

KR 20100024873 A machine translation (Year: 2025).*

International Search Report dated Dec. 4, 2023, issued by the International Searching Authority in International Application No. PCT/KR2023/011625.

Written Opinion dated Dec. 4, 2023, issued by the International Searching Authority in International Application No. PCT/KR2023/011625.

Extended European Search Report issued Jun. 10, 2025 by the European Patent Office for EP Patent Application No. 23875035.0.

Communication dated Nov. 4, 2025, issued by the European Patent Office in European Application No. 23875035.0.

Communication issued Feb. 3, 2026 by the Korean Ministry of Intellectual Property in Korean Patent Application No. 10-2022-0126627.

* cited by examiner

DISPLAY DEVICE USING IMAGE DATA FROM A SCALER AND METHOD FOR CONTROLLING SAME

CROSS-REFERENCE TO RELATED APPLICATION(S)

This application is a continuation of International Application No. PCT/KR2023/011625, filed on Aug. 8, 2023, in the Korean Intellectual Property Receiving Office, which claims priority to Korean Patent Application No. 10-2022-0126627, filed on Oct. 4, 2022, in the Korean Intellectual Property Office, the disclosures of which are incorporated by reference herein in their entireties.

BACKGROUND

1. Field

The disclosure relates to a display device and a method for controlling the same, and more particularly, to a display device that includes a display module and a method for controlling the same.

2. Description of Related Art

Each display module included in a modular display panel may include a display panel and various configurations (e.g., a power integrated circuit (IC), a data driver IC, etc.) for driving the same.

At this time, each configuration for driving the display panel may have hardware variations for each display module. Such hardware variations may be problematic for generating a difference in an on time of each display module when driving an initial screen of the modular display panel coupled with a plurality of display modules, and being visible to a user.

SUMMARY

According to an aspect of the disclosure, there is provided a display device, including: a display module; a scaler configured to output image data in a pre-defined format by processing an image signal input through an input source; and a timing controller configured to control an operation of the display module based on the image data output from the scaler, wherein the pre-defined format includes an image frame period in which the image data is included and a blank period in which the image data is not included, wherein the scaler is configured to output a panel on signal for turning-on the display module by using the blank period, and wherein the timing controller is configured to turn-on the display module based on the panel on signal included in the blank period being identified.

The timing controller is configured to output black image data from at least one image frame period to the display module after turning-on the display module based on the panel on signal.

The scaler is configured to output the image data using an image frame period after a blank period included with the panel on signal, and wherein the timing controller is configured to output the image data to the display module from an image frame period after the at least one image frame period from which the black image data is output.

The display module comprises: a display panel; a data driver configured to provide the image data to the display panel; and a power integrated circuit (IC) configured to supply power to the display panel and the data driver, and the timing controller configured to output, based on the panel on signal being identified, a control signal for turning-on the power IC to the power IC.

The scaler is configured to output, based on a user command for turning-on the display module being received while the display device is operating in a standby mode, the panel on signal for turning-on the display module using the blank period, and wherein the scaler and the timing controller are in a turned-on state and the power IC is in a turned-off state in the standby mode.

The display device may include a modular display panel that includes a plurality of display modules arranged in a matrix form, wherein the display module is any one display module from among the plurality of display modules.

According to an aspect of the disclosure, there is provided a method for controlling a display device comprising a display module, a scaler that outputs image data in a pre-defined format by processing an image signal input through an input source, and a timing controller, the method comprising: outputting, by the scaler, a panel on signal for turning-on the display module; and turning-on, by the timing controller, the display module based on the panel on signal being identified, wherein the pre-defined format includes an image frame period in which the image data is included and a blank period in which the image data is not included, and wherein the scaler outputs the panel on signal using the blank period.

The timing controller, black image data from at least one image frame period to the display module after turning-on the display module based on the panel on signal.

The method may include outputting, by the scaler, the image data using an image frame period after a blank period included with the panel on signal; and outputting, by the timing controller, the image data from an image frame period after the at least one image frame period from which the black image data is output to the display module.

The display module may include a display panel, a data driver for providing the image data to the display panel, and a power integrated circuit (IC) for supplying power to the display panel and the data driver, and wherein the turning-on the display module comprises outputting, based on the panel on signal being identified, a control signal for turning on the power IC by the timing controller to the power IC.

The outputting the panel on signal may include: receiving a user command for turning-on the display module while the display device is operating in a standby mode; and outputting the panel on signal for turning-on the display module using the blank period, and the scaler and the timing controller are in a turned-on state and the power IC is in a turned-off state in the standby mode.

The display device may include: a modular display panel that includes a plurality of display modules arranged in a matrix form, and the display module is any one display module from among the plurality of display modules.

According to an aspect of the disclosure, there is provided a non-transitory computer-readable medium that stores computer instructions for a display device to perform an operation when executed by a processor of the display device which includes a display module, a scaler that outputs image data in a pre-defined format by processing an image signal input through an input source, and a timing controller, the operation including: outputting, by the scaler, a panel on signal for turning-on the display module; and turning-on, by the timing controller, the display module based on the panel on signal being identified, wherein the pre-defined format includes an image frame period in which the image data is included and a blank period in which the image data is not included, and wherein the scaler outputs the panel on signal using the blank period.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

In describing the disclosure, if it is determined that the detailed description of related known technologies may unnecessarily confuse the gist of the disclosure, the detailed description thereof will be omitted. In addition, redundant descriptions of the same configurations will be omitted.

Suffixes such as "part" for elements used in the description below have been added or used combined therewith considering its easiness in preparing the disclosure, and do not have meaning or role that distinguishes one another on its own.

Terms used in the disclosure are used to describe embodiments, and are not intended to limit the disclosure. A singular expression includes a plural expression, unless otherwise specified.

It is to be understood that the terms such as "have" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element). Conversely, when a certain element (e.g., first element) is indicated as "directly coupled with/to" or "directly connected to" another element (e.g., second element), it may be understood as the other element (e.g., third element) not being present between the certain element and the another element.

The terms used in the disclosure may be interpreted to have meanings generally understood to one of ordinary skill in the art unless otherwise defined.

Various embodiments of the disclosure will be described in detail below with reference to the accompanied drawings.

Figure 1:
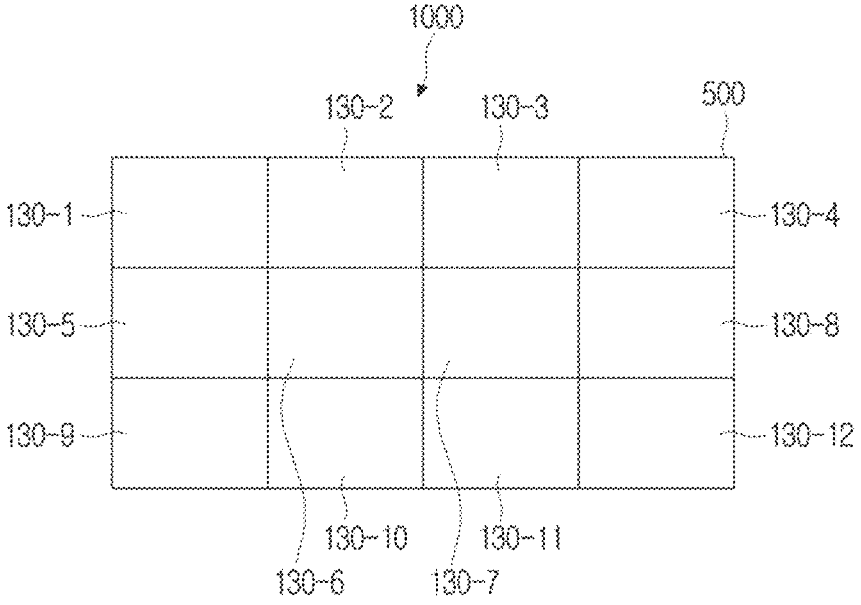
FIG. 1 is a diagram illustrating a display device according to an embodiment of the disclosure.

FIG. 1 is a diagram illustrating a display device according to an embodiment of the disclosure.

According to an embodiment of the disclosure a display device 1000 may include a modular display panel 500.

The modular display panel 500 may be configured by a plurality of display modules 130-1 to 130-12 being coupled or assembled to constitute one display panel, and in FIG. 1, an example of twelve display modules 130-1 to 130-12 configuring one modular display panel 500 has been provided, but is not limited thereto.

The modular display panel 500 may applicable to a small-scale display device 1000 such as a monitor, a television (TV), and a notebook, or a large-scale display device 1000 such as a digital signage and an electronic display video wall.

When an image starts to be displayed in the modular display panel 500 in a turned-off state, it is useful for each of the display modules 130-1 to 130-12 to be simultaneously turned-on. However, as described above, control devices (e.g., a power integrated circuit (IC), a driver IC, etc.) included in each of the display modules 130-1 to 130-12 may have variations in hardware characteristics for each display module. Accordingly, even if a control signal for turning-on each of the display modules 130-1 to 130-12 is applied simultaneously to each of the display modules 130-1 to 130-12, the actual display modules 130-1 to 130-12 may not be simultaneously turned-on and may be sequentially turned-on due to the above-described variation.

In the related art, in order to prevent such sequential turning-on operation from being recognized by a user, signals (e.g., an output signal of a power IC, etc.) indicating that each of the display modules 130-1 to 130-12 has been turned-on were grouped in a form of logic gate (e.g., AND/OR/XOR, etc.), and after checking that all of the display modules 130-1 to 130-12 have been turned-on through the above, an image was simultaneously displayed in each of the display modules 130-1 to 130-12.

However, in the case, additional hardware configuration or wiring was required for the logic gate configuration, and delays were generated due to the image not being displayed on a screen until all of the display modules 130-1 to 130-12 were turned-on.

As it will be described in detail below, according to one or more embodiments of the disclosure, a blank period of a data signal for turning-on each of the display modules 130-1 to 130-12 may be used. In addition, an actual image may be displayed after displaying a black screen using an image frame period of the data signal. Accordingly, the problem of each of the display modules 130-1 to 130-12 of the modular display panel 500 being sequentially turned-on may be solved without increase in hardware complexity or delay in screen display.

Figure 2:
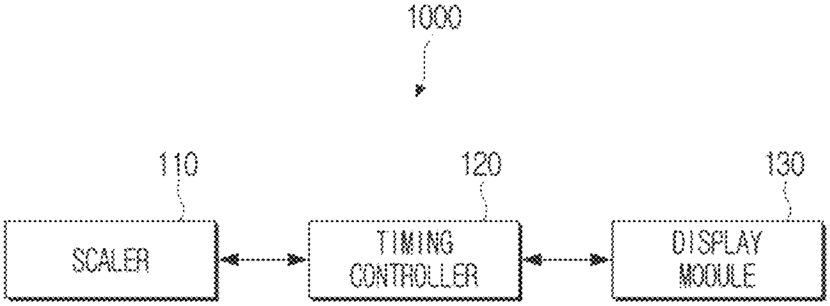
FIG. 2 is a block diagram illustrating a configuration of a display device according to an embodiment of the disclosure.

FIG. 2 is a block diagram illustrating a configuration of a display device according to an embodiment of the disclosure.

Referring to FIG. 2, the display device 1000 may include a scaler 110, a timing controller 120, and a display module 130.

The display module 130 may display various images. To this end, the display module 130 may include a display panel including light emitting elements. In addition, the display module 130 may include various control ICs (e.g., power IC, data driver IC, etc.) for controlling an operation of the display panel. The display module 130 may constitute the modular display panel 500 by being coupled in plurality.

The scaler 110 may receive input of an image signal from various sources such as, for example, and without limitation, a broadcasting receiver, a high definition multimedia interface (HDMI), a universal serial bus (USB), USB-C, internet, and the like, and output image data to the timing controller 120 after performing an image quality processing of adjusting resolution, sharpness, contrast, grayscale, and the like of the input source image signal.

At this time, the image data output by the scaler 110 may have a pre-defined format. Here, the pre-defined format may be a video data format in a form in which the image frame period in which the image data is included and the blank period in which the image data is not included are alternatively repeated, and may be a video data format such as, for example, and without limitation, a V by one, LVDS, and the like, but is not limited thereto.

Figure 3A:
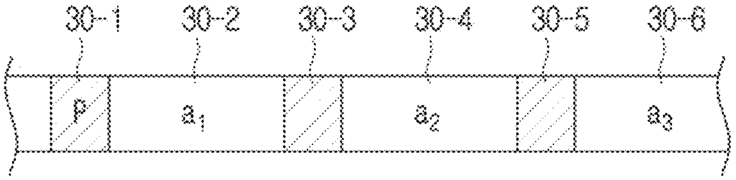
FIG. 3A is a diagram illustrating a data format being output from a scaler to a timing controller according to an embodiment of the disclosure.

FIG. 3A is a diagram illustrating an example of data format output from the scaler 110 to the timing controller 120 according to an embodiment of the disclosure. Referring to FIG. 3A, the data format may include image frame periods 30-2, 30-4, and 30-6 in which an actual image data to be displayed in the display module 130 is included, and blank periods 31-1, 30-3, and 30-5 between an image frame period and an image frame period in which the actual image data is not included.

Because the blank period is a period in which actual image data is not included, even if a signal promised in the relevant period is included, it does not affect the image shown to the user. Accordingly, according to an embodiment of the disclosure, the scaler 110 may output a panel on signal for turning-on the display module 130 using the blank period described above. At this time, the panel on signal may be a signal promised to perform an operation of turning-on the display module 130 when the timing controller identifies the same, and may be, for example, a digital signal such as 101010, but is not limited thereto. The scaler 110 may output image data using an image frame period after a blank period included with the panel on signal.

Referring to FIG. 3A, the scaler 110 first outputting a panel on signal P using a blank period 30-1, and outputting image data a1, a2, a3 . . . using image frame periods 30-2, 30-4, 30-6 . . . thereafter is shown.

The timing controller 120 may control an operation of the display module 130 based on image data output from the scaler 110. The timing controller 120 may be referred as T-CON, and output various control signals and timing controlled image data to the display module 130 for the image data output from the scaler 110 to be displayed in the display module 130.

According to an embodiment of the disclosure, the timing controller 120 may turn-on the display module 130 based on the panel on signal included in the blank period being identified.

The timing controller 120 may periodically check data of the blank period before the image data is received from the scaler 110. Accordingly. When the panel on signal is identified from the blank period, the timing controller 120 may turn-on the display module 130 by outputting a control signal (e.g., power IC on signal) to turn-on the display module 130 to the display module.

According to an embodiment of disclosure described above, because the display module 130 may be turned-on using the blank period included in an image data format output by the scaler 110, the hardware configuration becoming complicated to implement the logic gate as in the related art may be prevented.

According to an embodiment of the disclosure, the timing controller 120 may output black image data from at least one image frame period following the blank period included with the panel on signal to the display module 130.

The timing controller 120 may turn-on the display module 130 when the panel on signal is identified from the blank period 30-1. However, the timing controller 120 may output, even if image data a1, a2, a3 . . . is identified from image frame periods 30-2, 30-4, 30-6 . . . thereafter, the image data a1, a2, a3 . . . after outputting black data during at least one image frame period rather than outputting the same immediately.

As described above, even if an on signal is applied simultaneously to the plurality of display modules 130-1 to 130-12 that constitute the modular display panel 500, there may be a variation in time at which each of the display modules 130-1 to 130-12 is turned-on due to the hardware variations.

However, by displaying the black screen for a certain time (at least one image frame period) after turning-on each of the display modules 130-1 to 130-12 using the blank period, and simultaneously displaying an image thereafter, the user may be prevented from recognizing each of the display modules 130-1 to 130-12 being sequentially turned-on. Because one or several image frame periods are very short time periods, the user may experience an effect such as the plurality of display modules 130-1 to 130-12 being simultaneously turned-on.

Figure 3B:
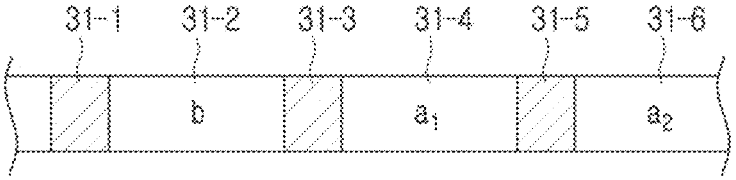
FIG. 3B is a diagram illustrating a data format being output from a timing controller to a display module according to an embodiment of the disclosure.

FIG. 3B shows an example of a data format output by the timing controller 120 to the display module 130 if the image data like that of FIG. 3A is received from the scaler 110. Referring to FIG. 3B, the data format output by the timing controller 120 to the display module 130 also including blank periods 31-1, 31-3, 31-5 . . . and image frame periods 31-2, 31-4, 31-6 . . . is shown.

At this time, the timing controller 120 may identify the panel on signal P from the image data signal received from the scaler 110, and turn-on the display module 130 at a time corresponding to, for example, a blank period 31-1. Then, the timing controller 120 outputting black data b in an image frame period 31-2 that follows the blank period 31-1, and outputting image data a1, a2 . . . by using image frame periods 31-4, 31-6 . . . after the image frame period 31-2 during which black data b is output may be seen.

That is, even if the panel on signal P and the image data a1, a2, a3 . . . are received in an order like that of FIG. 3A, the timing controller 120 may insert the black image data before outputting the image data a1, a2, a3 . . . after turning-on the display module 130 as shown in FIG. 3B. In FIG. 3B, although the black image data being inserted into one image frame period 31-2 has been provided as an example, but the embodiment is not limited thereto, and the black image data may be inserted to two or more consecutive image frame periods according to an embodiment.

As described above, by operating each of the display modules 130-1 to 130-12 included in the modular display panel 500, the problem of the display modules 130-1 to 130-12 being sequentially turned-on may be solved without increase in hardware complexity or delay in screen display due to adding of the logic gate, and the like.

In the above, in order to turn-on the display module 130 and display a black image, receiving the image data signal as in FIG. 3A from the scaler 110 and arbitrarily inserting the black data by the timing controller 120 have been provided as examples, but the embodiment is not limited thereto.

Figure 3C:
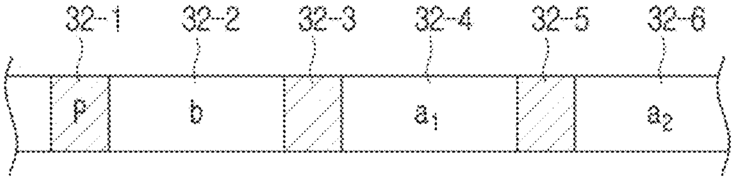
FIG. 3C is a diagram illustrating a data format being output from a scaler to a timing controller according to an embodiment of the disclosure.

For example, the black image data may be included in the image data signal output by the scaler 110. FIG. 3C is a diagram illustrating a format of an image data signal output by the scaler 110 according to an embodiment of the disclosure. Referring to FIG. 3C, the scaler 110 outputting the panel on signal P using a blank period 32-1, outputting black image data b using an image frame period 32-2 that follows the blank period 32-1, and outputting image data a1, a2 . . . using image frame periods 32-4, 32-6 . . . thereafter may be seen. In this case, the timing controller 120 may output the black image data b and the image data a1, a2 . . . in an order as shown in FIG. 3B even if the black image data is not inserted separately after turning-on the display module 130 by identifying the panel on signal P included in the blank period 32-1.

Figure 4:
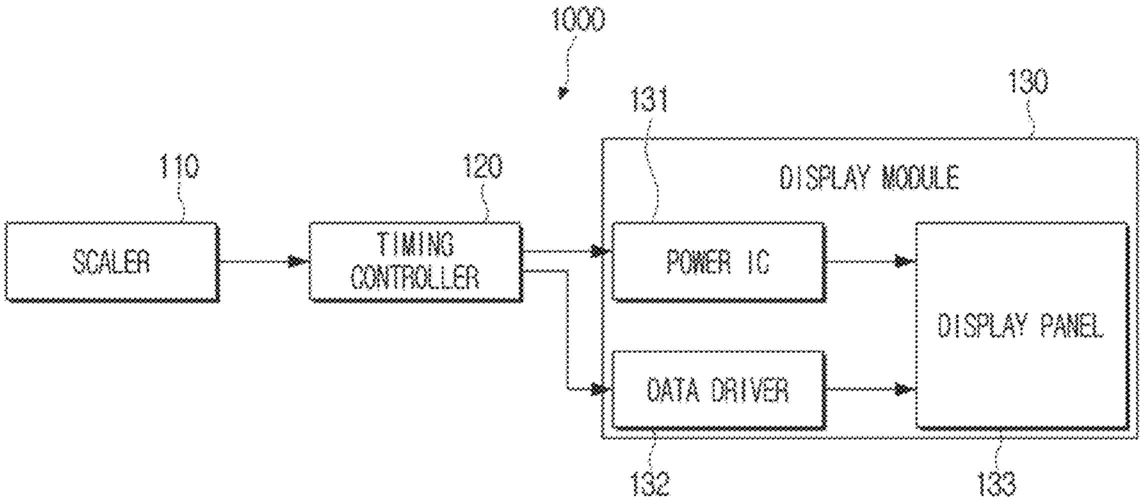
FIG. 4 is a block diagram illustrating a configuration of a display device according to an embodiment of the disclosure.

FIG. 4 is a block diagram illustrating a configuration of a display device according to an embodiment of the disclosure. In describing FIG. 4, redundant descriptions of same configurations as described above will be omitted.

Referring to FIG. 4, the display device 1000 may include the scaler 110, the timing controller 120, and the display module 130. At this time, the display module may include a power IC 131, a data driver 132, and a display panel 133.

The display panel 133 may display an image through a pixel array. At this time, each pixel (or sub pixel) that constitute the pixel array may be implemented in various display technology such as, for example, and without limitation, a liquid crystal display (LCD) panel, a light emitting diode (LED), organic light emitting diodes (OLED), a micro LED, and the like. The display panel 133 may be implemented by whichever method from among an active matrix (AM) method or a passive matrix (PM) method.

The data driver 312 may receive image data from the timing controller 120 and generate a data signal to be applied to the display panel 133, and output the generated data signal to the display panel 133.

Although not shown, the display module 130 may further include a gate driver for generating a gate signal for driving the pixel array on a line basis, and outputting the generated gate signal to the display panel 133.

The power IC 131 may supply various power for operating the display module 130 by control of the timing controller 120. For example, the power IC 131 may supply power (e.g., driving voltage, power voltage) to the display panel 133 and the data driver 132. Accordingly, when the power IC 131 is in the turned-off state, the display panel 133 and the data driver 132 may also be in the turned-off state.

The timing controller 120 may control the overall operation of the display module 130. The timing controller 120 may output a control signal for controlling power of the power IC 131 to the power IC 131, and output timing controlled image data to the data driver 132.

According to an embodiment of the disclosure, the timing controller 120 may output, based on the above-described panel on signal being identified, a control signal for turning-on the power IC 131 to the power IC 131. Accordingly, when the power IC 131 is turned-on, power may be supplied to the data driver 132 and the display panel 133, and the display module 130 may be turned-on.

For example, the display device 1000 may operate in a standby mode. Here, the standby mode may be a mode in which power is supplied to only a portion of the configurations in the display device 1000, and the display device 1000 may operate, when, for example, a user command for entering into the standby mode is input or when there is no user operation for the display device 1000 for a certain time or more, in the standby mode to reduce power consumption.

According to an embodiment of the disclosure, in the standby mode, the scaler 110 and the timing controller 120 may be in the turned-on state, and the power IC 131 may be in the turned-off state. When the power IC 131 is in the turned-off state, because power is not supplied to the data driver 132 and the display panel 133, the display module 130 may be in the turned-off state.

As described above, if a user command for turning-on the display device 1000 is received while the display device 1000 is operating in the standby mode, the display device 1000 may turn-on the display module 130 and display an image signal input through an input source.

Based on the user command for turning-on the display device 1000 being received while the display device 1000 is operating in the standby mode, the scaler 110 may output the panel on signal for turning-on the display module 130 using the blank period as described above, and accordingly, the timing controller 120 may turn-on the display module 130 by outputting the control signal for turning-on the power IC 131 to the power IC 131 by identifying the panel on signal. Accordingly, the image signal input through the input source may be displayed in the display module 130. After the display module 130 is turned-on, the black image being displayed by the timing controller 120 for a very short time (i.e., above-described one or several image frame periods) that is imperceptible to the user is as described above.

Figure 5:
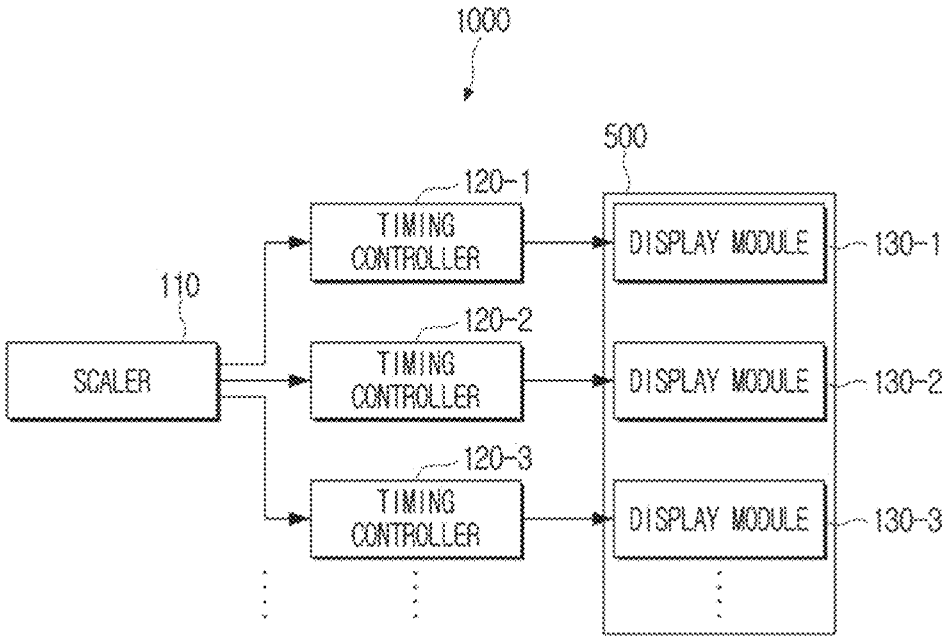
FIG. 5 is a block diagram illustrating a configuration of a display device according to an embodiment of the disclosure.

FIG. 5 is a block diagram illustrating a configuration of a display device according to an embodiment of the disclosure. In describing FIG. 5, descriptions overlapping with that described above will be omitted.

Referring to FIG. 5, the display device 1000 may include the scaler 110, a plurality of timing controllers 120-1, 120-2, 120-3 . . . , and a plurality of display modules 130-1, 130-2, 130-3 . . . . At this time, the plurality of display modules 130-1, 130-2, 130-3 . . . may be coupled or assembled with one another in a matrix form as described above in FIG. 1 to constitute one large-area display panel, that is, the modular display panel 500.

A timing controller 120-1 and a display module 130-1, or a timing controller 120-2 and a display module 130-2, or a timing controller 120-3 and a display module 130-3 shown in FIG. 5 may all perform the same operations as that of the timing controller 120 and the display module 130 described above.

In FIG. 5, the display device 1000 in which timing controllers 120-1, 120-2, 120-3 . . . for controlling operations of the display modules 130-1, 130-2, 130-3 . . . are present for every display module has been provided as an example, but the embodiment is not limited thereto. For example, the display device 1000 may be configured for one timing controller to control operations of two or more display modules. Even in this case, the relationship between the one timing controller and the display modules that receive the control of the timing controller may be same as the relationship of the timing controller 120 and the display module 130 described above.

Figure 6:
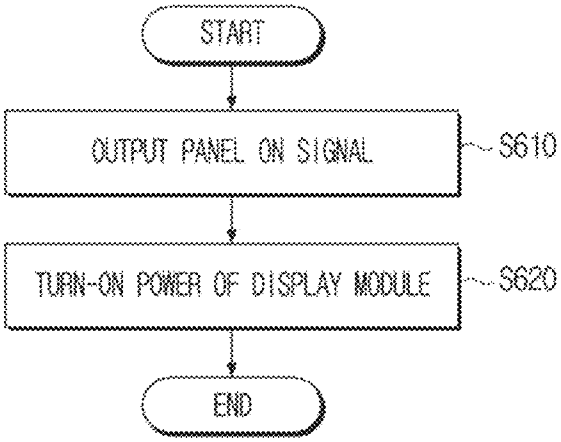
FIG. 6 is a flowchart illustrating a control method of a display device according to an embodiment of the disclosure.

FIG. 6 is a flowchart illustrating a control method of a display device according to an embodiment of the disclosure. At this time, the display device 1000 may include the display module 130, the scaler 110 that outputs image data in the pre-defined format by processing the source image signal, and the timing controller 120. Here, the pre-defined format may include the image frame period in which the image data is included and the blank period in which the image data is not included.

Referring to FIG. 6, the scaler 110 may output the panel on signal for turning-on the display module 130 using the blank period (S610).

Accordingly, the timing controller 120 may turn-on the display module 130 based on the panel on signal being identified from the scaler 110 (S620).

According to an embodiment of the disclosure, the timing controller 120 may output black image data from at least one image frame period to the display module 130 after turning-on the display module based on the panel on signal.

In addition, the scaler 110 may output the image data using the image frame period after the blank period in which the panel on signal is included, and the timing controller 120 may output the image data from the image frame period after the at least one image frame period from which the black image data is output to the display module 130.

According to an embodiment of the disclosure, the display module 130 may include the display panel 133, the data driver 132 for providing the image data to the display panel 133, and the power IC 131 for supplying operating power to the display panel 133 and the data driver 132, and the timing controller 120 may output, based on the panel on signal being identified, the control signal for turning-on the power IC 131 to the power IC 131.

In addition, according to an embodiment of the disclosure, if the user command for turning-on the display module 130 is received while the display device 1000 is operating in the standby mode, the scaler 110 may output the panel on signal for turning-on the display module 130 using the blank period. At this time, in the standby mode, the scaler 110 and the timing controller 120 may be in the turned-on state, and the power IC 131 may be in the turned-off state.

According to an embodiment of the disclosure, the display device 1000 may include the modular display panel 500 which includes the plurality of display modules 130-1 to 130-12 arranged in matrix form, and the above-described display module 130 may be any one from among the plurality of display modules 130-1 to 130-12.

According to the various embodiments of the disclosure as described above, the problem of each of the display modules 130-1 to 130-12 of the modular display panel 500 being sequentially turned-on may be solved without increase in hardware complexity or delay in screen display.

The various embodiments of the disclosure may be implemented with software including instructions stored in a machine-readable storage media (e.g., computer). Here, the machine may call a stored instruction from the storage medium, and as a device operable according to the called instruction, may include the display device 1000 according to the above-mentioned embodiments.

Based on the instruction being executed by various processors (the above-described scaler, timing controller may also be a processor), the processor may directly or using other elements under the control of the processor perform a function corresponding to the instruction. The instruction may include a code generated by a compiler or executed by an interpreter. The machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

According to an embodiment, a method according to the various embodiments described in the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in a storage medium such as a server of a manufacturer, a server of an application store, or a memory of a relay server, or temporarily generated.

Each of the elements (e.g., a module or a program) according to various embodiments may be configured as a single entity or a plurality of entities, and a portion of sub-elements from among the above-mentioned sub-elements may be omitted, or other sub-elements may be further included in the various embodiments. Alternatively or additionally, a portion of the elements (e.g., modules or programs) may be integrated into one entity to perform the same or similar functions performed by the respective relevant elements prior to integration. Operations performed by a module, a program, or another element, in accordance with various embodiments, may be executed sequentially, in a parallel, repetitively, or in a heuristic manner, or at least a portion of the operations may be executed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display device, comprising:

a display module;

a scaler configured to output image data in a pre-defined format by processing an image signal input through an input source; and a timing controller configured to control an operation of the display module based on the image data output from the scaler, wherein the pre-defined format includes an image frame period in which the image data is included and a blank period in which the image data is not included, wherein the scaler is configured to output a panel on signal for turning-on the display module by using the blank period, and output the image data using an image frame period after a blank period included with the panel on signal, and wherein the timing controller is configured to turn-on the display module based on the panel on signal included in the blank period being identified, and output the image data to the display module from an image frame period after at least one image frame period from which black image data is output.

2. The display device of claim 1, wherein the timing controller is configured to output the black image data from the at least one image frame period to the display module after turning-on the display module based on the panel on signal.

3. The display device of claim 1, wherein the display module comprises:

a display panel;

a data driver configured to provide the image data to the display panel; and a power integrated circuit (IC) configured to supply power to the display panel and the data driver, and the timing controller configured to output, based on the panel on signal being identified, a control signal for turning-on the power IC to the power IC.

4. The display device of claim 3, wherein the scaler is configured to output, based on a user command for turning-on the display module being received while the display device is operating in a standby mode, the panel on signal for turning-on the display module using the blank period, and wherein the scaler and the timing controller are in a turned-on state and the power IC is in a turned-off state in the standby mode.

5. The display device of claim 1, comprising a modular display panel that includes a plurality of display modules arranged in a matrix form, wherein the display module is any one display module from among the plurality of display modules.

6. A method for controlling a display device comprising a display module, a scaler that outputs image data in a pre-defined format by processing an image signal input through an input source, and a timing controller, the method comprising:

outputting, by the scaler, a panel on signal for turning-on the display module; and turning-on, by the timing controller, the display module based on the panel on signal being identified, wherein the pre-defined format includes an image frame period in which the image data is included and a blank period in which the image data is not included, wherein the scaler outputs the panel on signal using the blank period, and wherein the method further comprises:

outputting, by the scaler, the image data using an image frame period after a blank period included with the panel on signal; and outputting, by the timing controller, the image data from an image frame period after at least one image frame period from which black image data is output to the display module.

7. The method of claim 6, comprising outputting, by the timing controller, the black image data from the at least one image frame period to the display module after turning-on the display module based on the panel on signal.

8. The method of claim 6, wherein the display module comprises a display panel, a data driver for providing the image data to the display panel, and a power integrated circuit (IC) for supplying power to the display panel and the data driver, and wherein the turning-on the display module comprises outputting, based on the panel on signal being identified, a control signal for turning on the power IC by the timing controller to the power IC.

9. The method of claim 8, wherein the outputting the panel on signal comprises:

receiving a user command for turning-on the display module while the display device is operating in a standby mode; and outputting the panel on signal for turning-on the display module using the blank period, and the scaler and the timing controller are in a turned-on state and the power IC is in a turned-off state in the standby mode.

10. The method of claim 6, wherein the display device comprises:

a modular display panel that includes a plurality of display modules arranged in a matrix form, and the display module is any one display module from among the plurality of display modules.

11. A non-transitory computer-readable medium that stores computer instructions for a display device to perform an operation when executed by a processor of the display device which comprises a display module, a scaler that outputs image data in a pre-defined format by processing an image signal input through an input source, and a timing controller, the operation comprising:

outputting, by the scaler, a panel on signal for turning-on the display module; and turning-on, by the timing controller, the display module based on the panel on signal being identified, wherein the pre-defined format includes an image frame period in which the image data is included and a blank period in which the image data is not included, wherein the scaler outputs the panel on signal using the blank period, and wherein the operation further comprises:

outputting, by the scaler, the image data using an image frame period after a blank period included with the panel on signal; and outputting, by the timing controller, the image data from an image frame period after at least one image frame period from which black image data is output to the display module.

12. The non-transitory computer readable medium as claimed in claim 11, wherein the operation further comprises:

outputting, by the timing controller, the black image data from the at least one image frame period to the display module after turning-on the display module based on the panel on signal.

13. The non-transitory computer readable medium as claimed in claim 11, wherein the display module comprises:

a display panel, a data driver for providing the image data to the display panel, and a power integrated circuit (IC) for supplying power to the display panel and the data driver, and wherein the turning-on the display module comprises:

outputting, based on the panel on signal being identified, a control signal for turning on the power IC by the timing controller to the power IC.

14. The non-transitory computer readable medium as claimed in claim 13, wherein the outputting the panel on signal comprises:

receiving a user command for turning-on the display module while the display device is operating in a standby mode; and outputting the panel on signal for turning-on the display module using the blank period, and the scaler and the timing controller are in a turned-on state and the power IC is in a turned-off state in the standby mode.

15. The non-transitory computer readable medium as claimed in claim 11, wherein the display device comprises:

a modular display panel that includes a plurality of display modules arranged in a matrix form, and the display module is any one display module from among the plurality of display modules.

* * * * *